United States Patent [19]

Abe et al.

[11] Patent Number: 4,907,709
[45] Date of Patent: Mar. 13, 1990

[54] COMBINATION OF SYNTHETIC RESIN BOTTLE AND CLOSURE THEREFOR

[75] Inventors: Morio Abe; Ichiro Yokota, both of Ageo, Japan

[73] Assignee: Dainippon Ink and Chemicals, Inc., Tokyo, Japan

[21] Appl. No.: 269,599

[22] Filed: Nov. 10, 1988

[30] Foreign Application Priority Data

Nov. 11, 1987 [JP] Japan ................................. 62-283088

[51] Int. Cl.⁴ ............................................... B65D 53/00
[52] U.S. Cl. .................................... 215/252; 215/329; 215/344
[58] Field of Search ......... 215/329, 341, 344, DIG. 1, 215/252

[56] References Cited

U.S. PATENT DOCUMENTS

| | | | |
|---|---|---|---|
| 2,965,256 | 12/1960 | Yochem | 215/329 |
| 3,901,404 | 8/1975 | Feldman | 215/256 |
| 4,489,845 | 12/1984 | Aichinger et al. | 215/341 X |
| 4,501,781 | 2/1985 | Kushida et al. | 215/12.2 |
| 4,658,974 | 4/1987 | Fujita et al. | 215/12.2 |

FOREIGN PATENT DOCUMENTS

| | | | |
|---|---|---|---|
| 0093690 | 11/1983 | European Pat. Off. . | |
| 119788 | 9/1984 | European Pat. Off. | 215/329 |
| 0153894 | 9/1985 | European Pat. Off. . | |
| 607702 | 10/1978 | Switzerland | 215/341 |
| 1341847 | 12/1973 | United Kingdom . | |
| 2068914 | 8/1981 | United Kingdom | 215/341 |

Primary Examiner—Donald F. Norton
Attorney, Agent, or Firm—Burns, Doane, Swecker & Mathis

[57] ABSTRACT

A combination of a bottle (1) and a closure (2) for containing a drink, having an improved sealability. The bottle (1) is produced by a blow-molding process with a resin comprised mainly of a polyethylene terephthalate, so that a bottle neck (3) is in a non-crystalline state while a bottle body (5) is given an improved heat durability by a bi-axial orientation followed by a heat treatment for relaxation. The closure (2) is made of a thermoplastic resin such a a polyolefin and provided with a top wall and a side wall having a thread (7) on the inner surface (9) thereof corresponding to a thread (4) on the outer surface (12) of the bottle neck (3). The closure (2) has an annular shoulder (10) on the inner surface (8) of the top wall thereof which is engageable with the upper surface (11) of the bottle neck (3) and with the outer surface (12) of the bottle neck (3) adjacent thereto and an annular rib (13) protruded downward from the top wall at a place inside of the shoulder (10) to be resiliently engageable with the inner surface (14) of the side wall of the bottle neck (3).

5 Claims, 2 Drawing Sheets

COMBINATION OF SYNTHETIC RESIN BOTTLE AND CLOSURE THEREFOR

BACKGROUND OF THE INVENTION

1. Field of the Invention

The present invention relates to a bottle for containing a drink, particularly a drink not containing a carbonic acid gas, such as juice or tea, which bottle is formed by blow-molding synthetic resin, and is provided with a special closure.

2. Description of the Related Arts

Recently, most bottles for containing a drink such as juice or tea not containing carbonic acid gas are made of polyethylene terephthalate (PET) resin, by a blow-molding process, because PET is relatively low cost and has a good mechanical durability. One example of the production methods thereof is disclosed in Japanese Examined Patent Publication (Kokoku) No. 62-5781. According to this publication, a preform in a shape of test tube made of the above resin is put into a mold having a cavity corresponding to a contour of the required bottle while the preform is heated above a glass transition point of the resin. Then air is blown into the interior of the preform through a mouth thereof to expand the preform within the cavity. The air blowing is continued until the expanded preform is in contact with the inner wall of the mold, for a predetermined period, and the mold is maintained at a temperature above a crystallizing temperature of the resin so that interior stress in the expanded preform is relaxed. Finally, a PET bottle thus formed and having a narrow neck and a bi-axially oriented wide body as shown in FIG. 1, is removed from the mold.

When a drink such as juice is contained in this bottle, the juice is heated at a temperature of from 65° C. to 95° C. and poured therein, a closure is fitted on a neck of the bottle, and the bottle is laid horizontally so that the content therein reaches the inside of the neck to sterilize the closure and the entire interior of the bottle.

A roll-on closure-made of aluminum sheet is usually fitted to the bottle, and this capping is carried out in the following manner. A blank closure without a thread is fitted onto the bottle neck, around which a thread was formed during the molding process. The blank subjected to an axial load of more than 200 kg.wt, and at the same time, a disc is applied to the side wall of the blank closure in such a manner that a narrow edge of the disc presses the side wall into a thread groove on the bottle neck, and thus a thread corresponding to that on the bottle neck is formed on the closure and a tight capping is achieved.

As a result, a side wall of the bottle neck is always under an inward stress after capping, and the top surface of the bottle neck is under a downward stress.

It should be noted that the bottle neck has a lower softening point relative to the bottle body because the bottle neck has not been expanded and oriented during the molding process. Therefore, when the hot juice reaches the bottle neck and heats the same for sterilization, the temperature of the bottle neck is elevated above a glass transition point of the resin. Accordingly, the bottle neck is softened, and thus is deformed by the prestress caused by the closure, and therefore, the sealing effect of the closure is greatly reduced.

To eliminate this drawback, prior to the molding of the bottle body, the bottle neck is subjected to a heat treatment separately from the bottle body. In this special heat treatment, the bottle neck is crystallized to have a higher softening point, as disclosed in Japanese Examined Patent Publication (Kokoku) No. 61-35056.

This proposal, however, requires an additional device for heating the bottle neck alone, and a means for precisely controlling a dimensional change of the bottle neck during the heat treatment so that a closure is tightly fitted thereon, which causes technical difficulties, and further, raises the manufacturing cost. In addition, the crystallized bottle neck is made opaque, and does not match the transparent body.

SUMMARY OF THE INVENTION

An object of the present invention is to eliminate or at least mitigate the above-mentioned drawbacks of the prior arts.

Another object of the present invention is to provide a bottle and a closure therefor, which maintains a good sealability even though a crystallization treatment for a bottle neck is not carried out.

These objects are achieved by a bottle and a closure for containing a drink, and having an improved sealability, the bottle being produced by a blow-molding a resin comprising mainly a polyethylene terephthalate, such that the bottle neck is in a non-crystalline state while the bottle body is given an improved heat durability by a bi-axial orientation followed by a heat treatment for relaxation. The closure is formed of a resin and is provided with a top wall and a side wall having a thread on the inner surface thereof corresponding to a thread on the outer surface of the bottle neck. The present invention is characterized in that the closure has an annular shoulder on the top wall thereof which is engageable with the annular upper surface of the bottle neck and with the outer surface of the bottle neck adjacent thereto, and an annular rib protruded downward form the top wall at a place inside of the shoulder to be resiliently engageable with the inner surface of the side wall of the bottle neck.

The bottle may be formed solely of a polyethylene terephthalate resin.

Alternatively, the bottle may be formed of a laminated structure in which a core layer of a heat-durable resin is sandwiched by two skin layers of a polyethylene terephthalate resin. The closure is preferably formed of an polyolefin resin, and advantageously, is provided with a pilfer-proof device.

BRIEF DESCRIPTION OF THE DRAWINGS

These and other features and advantages of the present invention will be more apparent from the description of the preferred embodiments of the present invention, as illustrated in the attached drawings: wherein.

DESCRIPTION OF THE PREFERRED EMBODIMENTS

Figure 1:
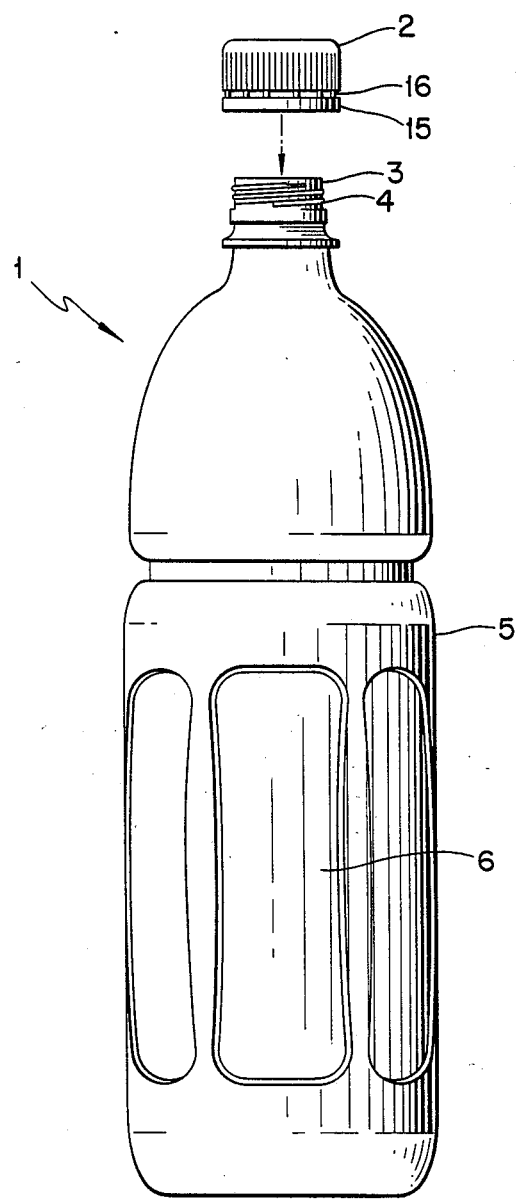
FIG. 1 is an exploded side elevational view illustrating a bottle and a closure according to the present invention.

FIG. 1 is an overall view of a bottle and a closure obtained by the present invention.

The bottle 1 is formed of a resin having a relatively high glass transition point, such as a polyethylene terephthalate (PET), by a blow-molding process, as in the prior arts previously described. The PET resin may be used alone or together with an other heat-durable resin, such as a polyarylate or a polyamide, which resin is sandwiched, as a core layer, by two skin layers of PET resin to form a laminated structure. The bottle 1 is molded to a predetermined shape in a mold, and further, is in contact with the inner surface of the mold maintained at a temperature of from 90° C. to 130° C. for a period of from 10 seconds to 30 seconds.

The bottle thus obtained is completely transparent and a neck 3 thereof has a predetermined inner diameter and is provided with a thread 4 on the outer side wall thereof. The bottle neck 3 has not been drawn during the blow-molding process and remains in a non-crystalline state. The body 5 of the bottle 1, however, has been bi-axially oriented at a predetermined draw ratio of from four to ten relative to the size of the original preform and then further heated within the mold to improve the heat-durability thereof. A concave deformable area 6 having a thinner wall is provided in a lower portion of the body 5, which area 6 can be easily deformed inward when a hot juice contained in the bottle 1 is cooled, as described later, so that an excessive drop in the inner pressure does not occur.

Figure 2A:
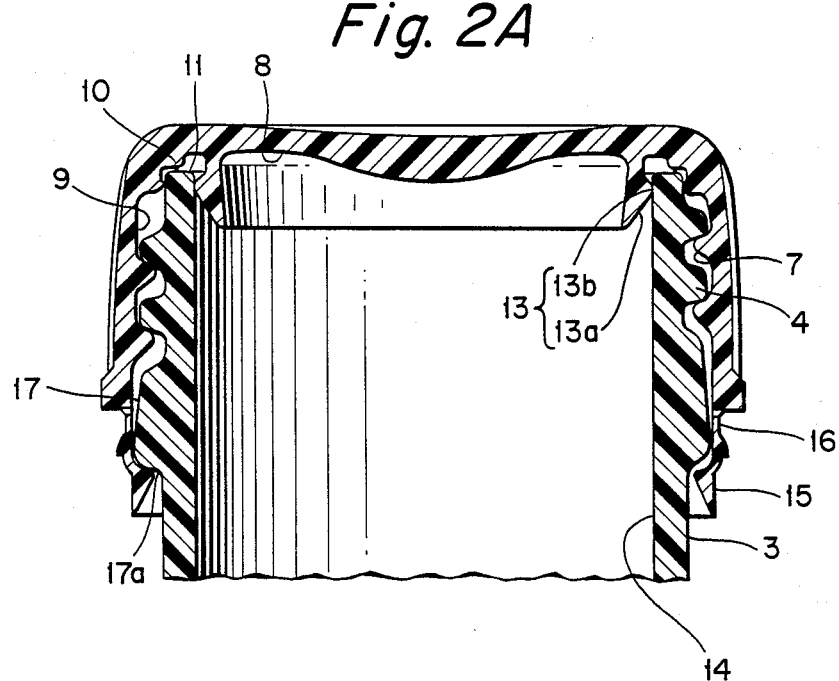
FIGS. 2A and 2B are an enlarged sectional view of a bottle neck engaged with a closure according to the present invention.
Figure 2B:
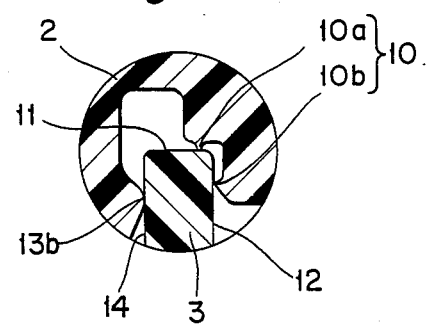

A closure 2 is formed of a resin such as a polypropylene and has a thread 7 on the inner surface 9 of a side wall corresponding to the thread 4 on the bottle neck 3. An annular-shape shoulder 10 is protruded downward from the inner surface 8 of a top wall, close to the inner surface 9 of the side wall. The shoulder 10 has an annular projection 10a engageable with an annular top surface 11 of the bottle neck 3 and another annular projection 10b engageable with an outer surface 12 of the side wall of the bottle neck 3 when the closure 2 is threaded onto the bottle neck 3. An annular rib 13 is provided inward and at a distance from the shoulder 10. As shown in FIG. 2, the rib 13 has a sloping 13a which slides on the inner edge of the top surface 11 of the bottle neck 3 during the capping operation, so that the rib 13 is gradually and resiliently strained inward by pressure from the side wall of the bottle neck 3, and a jaw 13b which is engageable with the inner surface 14 of the side wall of the bottle neck 3. According to this structure, the rib 13 resiliently presses the side wall of the bottle neck 3 outward when the capping operation is completed. Further, the closure 2 is provided with a pilfer-proof device in the lower portion thereof, comprising a ring 15 and a bridge 16 connecting the same to the closure body.

Now, the operation of the bottle and the closure described above will be explained below.

The bottle 1 is filled with a drink such as juice heated at a temperature of from 65° C. to 95° C., by a conventional filling process. Then the closure 2 is fitted to the bottle neck 3 and tightly fastened in such a manner that the ring 15 of the closure 2 overrides a bulge 17 of the bottle neck 3 formed in the lower portion thereof, to engage with a lower under-cut portion 17a. Then the bottle 1 is laid horizontally to insure a sterilization of the interior of the bottle neck 3 by the hot juice contained therein, and since the positional relationship between the closure 2 and the bottle neck 3 is as shown in FIG. 2, the side wall of the bottle neck 3 is firmly held without distortion by the rib 13 even though the non-crystalline neck 3 is softened by the heat transferred from the hot juice. In this connection, usually the upper portion of the side wall of the bottle neck 3 will fall inward rather than outward. In this case, according to the present invention, the side wall of the bottle neck 3 is increasingly pressed against the rib 13, which further enhances the sealability. In addition, since the closure 2 is made of a thermoplastic resin such as a polypropylene, which also softens under such a heated condition, the bottle neck 3 is not substantially subjected to stress during the sterilization process.

As the juice is cooled, the pressure in the interior of the bottle 1 gradually changes to a sub-atmospheric pressure, and the deformable area 6 is further concaved to suppress any pressure drop within the bottle 1. This also enhances the sealability of the bottle and closure in accordance with the present invention.

According to the present invention, the seal between the closure 2 and the bottle neck 3 is constituted by three parts; i.e., a main sealing part defined by a resilient contact of the rib 13 with the inner surface 14 of the side wall of the bottle neck 3 and two additional sealing parts defined by the engagement of the shoulder 10 with the upper surface 11 and with the outer surface 12. Therefore, even if the seal of one or two of these parts is broken by an unintentional force applied to the closure, for example, if the bottle falls down, the sealability is still maintained by the remaining part of parts, and thus leakage of the content or an ingress of outer air is prevented.

When the closure 2 is turned to open the bottle 1, the closure body rises upward along the bottle neck 3 while sliding on the thread 4, but the ring 15 is inhibited this rise due to contact with the under-cut 17a. Therefore, the bridge 16 must break at that time to remain the ring 15 beneath the under-cut 17a, which exhibits an evidence of closure removal.

The effects of the present invention will be more apparent from the following examples:

EXAMPLE 1

A preform was injection-molded, by a bottle former ASB-150 manufactured by NISSEI ASB KIKAI K.K., Japan, of a PET resin having an I.V. value of 0.75 after being thoroughly dried. After removal from the mold, the preform was transferred to a blow station while kept at a surface temperature of 110° C. At the blow station, the preform was put into a mold having a capacity of 1650 ml and preheated at a temperature of 120° C., and the preform was then subjected to blow molding for a bi-axial orientation, except for a neck thereof, followed by an additional heat treatment of the body portion for 20 seconds, while maintaining the blowing pressure at the same value, and thus a bottle as shown in FIG. 1 was obtained. The bottle had a neck inner diameter of 21 mm and a wall thickness of 1.5 mm; a body outer diameter of 94 mm and a wall thickness of 0.4 mm; and a total height of 305 mm.

An orange juice drink containing a 20% pure fruit content was poured into the bottle after being heated to 85° C., and a polypropylene closure having shape similar to that shown in FIG. 2 was fitted to the bottle neck.

The bottle was laid horizontally for 30 seconds to ensure sterilization of the bottle neck and closure, and thereafter, quenched to room temperature by cold water, whereby the content was contracted and the pressure inside the bottle became a sub-atmospheric pressure. The appearance of the bottle was substantially unchanged due to the action the deformable area of the bottle, and it was apparent from the concave shape of the deformable area that the sub-atmospheric state was maintained inside the bottle, which in turn showed the sealing effect was completed.

As a comparative example, a bottle having an aluminum roll-on closure was prepared in accordance with the above procedure.

Two groups of five samples No. 1 through 5 and No. 6 through 10 were prepared, for the examples of the present invention and for the comparative examples and a change in the inner diameter of the bottle neck before and after the sterilization was carried out, and a torque required for releasing the closure, were measured. The results are shown in Table 1.

TABLE 1

| Sample No. | Diameter Change (mm) | Torque for Release (kg-cm) | Leakage of Content (yes or no) |
|---|---|---|---|
| 1 | −0.04 | 12 | no |
| 2 | −0.01 | 13 | no |
| 3 | +0.01 | 11 | no |
| 4 | −0.02 | 13 | no |
| 5 | +0.02 | 11 | no |
| 6 | −0.45 | 2 | yes |
| 7 | −0.50 | 3 | yes |
| 8 | −0.49 | 3 | no |
| 9 | −0.50 | 4 | yes |
| 10 | −0.45 | 2 | yes |

(Note)
1. The measurement was conducted after the sample was maintained in a horizontal state in an environment of 20° C., for 20 hours after quenching.
2. Samples 1 through 5 are the present invention and 6 through 10 are the comparative example.

As apparent from the Table, according to the present invention, the change in the inner diameter of the bottle neck is less than 0.1 mm and no leakage of the content occurs. In addition, a torque required for releasing the closure is adequate and large enough to prevent an unintentional release of the closure. Conversely, the bottle necks of all of the comparative samples were deformed to a great extent during the sterilization process, whereby the sealability was damaged. In addition, the closure was easily released by only a small torque of less than 4 kg-cm.

EXAMPLE 2

A preform having an improved heat-durability was injection-molded, by a lamination bottle former ASB-50T manufactured by NISSEI ASB KIKAI K.K., Japan, of a PET resin having an I.V. value of 0.73 and a U-polymer (polyarylate resin produced by UNITIKA K.K., Japan) after being thoroughly dried. The preform had a three layered structure in which a U-polymer core was sandwiched by two PET skin layers. A weight ratio of the core relative to the skin layers was 1:10, taking the cost of the resins into account. After removal from the mold, the preform was subjected to a blow molding process under the same condition as in Example 1.

Hot cooling tea drink at 90° C. was poured into the bottle and a high density polyethylene closure having a shape similar to that of FIG. 2 was fitted to the bottle neck.

The bottle was laid horizontally for 30 seconds to ensure sterilization of the bottle neck and closure, and thereafter, quenched to room temperature by a cold water spray, whereby the content was contracted and the pressure inside the bottle became a sub-atmospheric pressure.

It was confirmed by an appearance test, that the interior of the bottle was maintained at a sub-atmospheric pressure and the sealability was good. No leakage of the content occurred even after storage for a week in an environment maintained at 5° C. A comparative sample using an aluminum roll-on closure leaked immediately after quenching following the sterilization. The measurement showed that the inner diameter of the bottle neck of the comparative sample decreased by 0.9 mm relative to that prior to sterilization.

As described above, according to the present invention, a PET bottle is fitted with a resin closure in such a manner that the upper portion of the side wall of the bottle neck is nipped by an annular shoulder and an annular rib provided on the closure. Particularly, since the rib holds the side wall of the bottle neck from the inside thereof, an inward bending of the side wall during the sterilization process is prevented, and thus an improved sealability is obtained. Note, the side wall usually is bent inward due to a prestress imparted in the capping process. In addition, the sealability of the present invention is always maintained at three parts, i.e., between the shoulder of the closure and the top surface of the bottle neck, between the shoulder and the outer surface of the side wall of the bottle neck, and between the rib of the closure and the inner surface of the side wall of the bottle neck, and therefore, the sealability is not broken even if the bottle is dropped, since it is almost impossible for all of the sealing parts to be unintentionally broken at the same time.

Further, since crystallization of the bottle neck is unnecessary, the cost of manufacturing the bottle is reduced and the resultant bottle is completely transparent, including the neck portion.

We claim:

1. A combination of a bottle and a closure for containing a drink, having an improved sealability, said bottle being produced by a blow-molding process with a resin comprised mainly of a polyethylene terephthalate, so that a bottle neck is in a non-crystalline state while a bottle body is given an improved heat durability by a bi-axial orientation followed by a heat treatment for relaxation, said closure being formed by a resin and provided with a top wall and a side wall having a thread on the inner surface thereof corresponding to a thread on the outer surface of the bottle neck, said closure comprising an annular shoulder on the top wall thereof which is engageable with the annular upper surface of said bottle neck and with the outer surface of the bottle neck adjacent thereto and an annular rib protruded downward from the top wall at a place inside the shoulder to be resiliently engageable with the inner surface of the side wall of the bottle neck.

2. A combination according to claim 1, wherein the bottle is formed of a polyethylene terephthalate resin alone.

3. A combination according to claim 1, wherein the bottle is formed of a laminated structure in which a core layer of a heat-durable resin is sandwiched by two skin layers of a polyethylene terephthalate resin.

4. A combination according to claim 1 wherein the closure is formed of an polyolefin resin.

5. A combination according to claim 1 wherein the closure is provided with a pilfer-proof means.

* * * * *